United States Patent Office

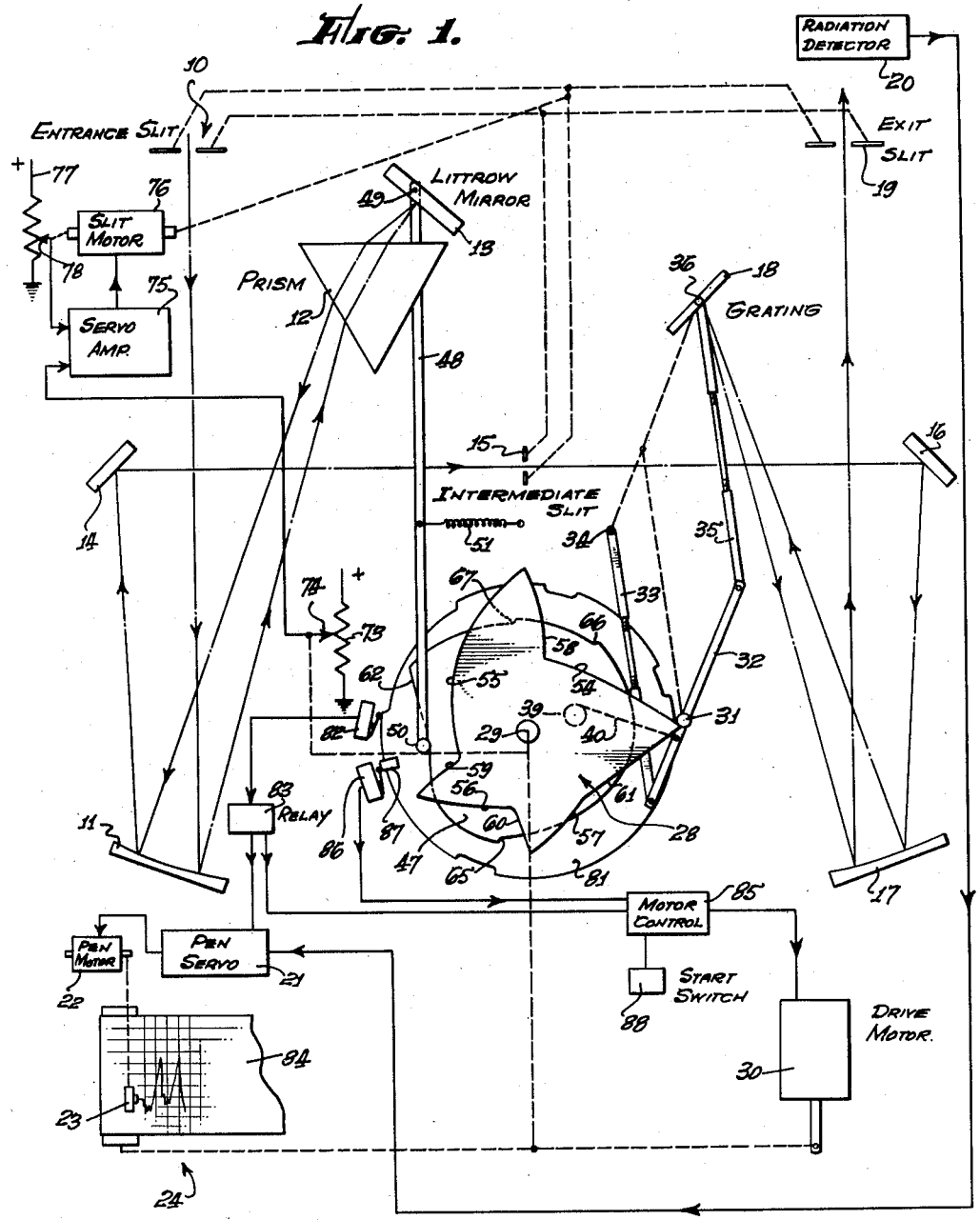

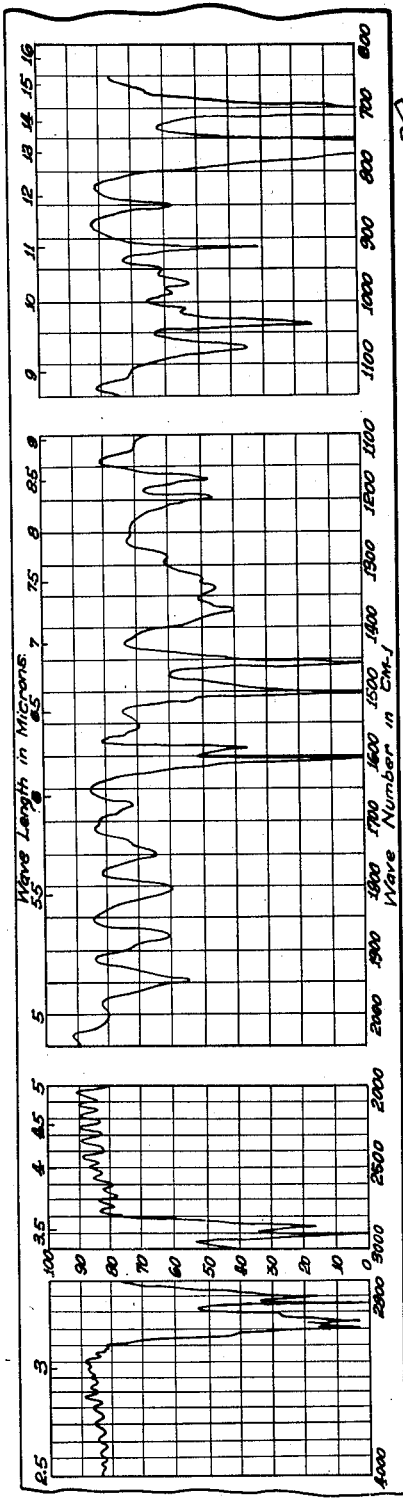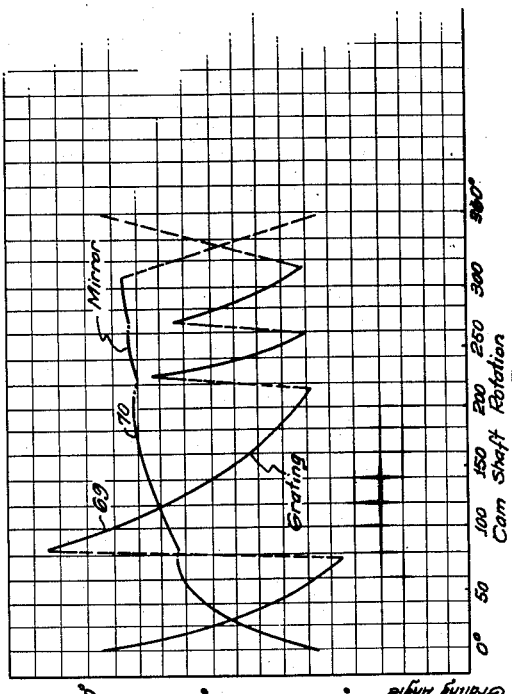
INVENTORS.
WILLIAM M. WARD,
JOSEPH ASHLEY,
BY THEIR ATTORNEYS
HARRIS, KIECH, FOSTER & HARRIS.

2,948,185
Patented Aug. 9, 1960

2,948,185

SPECTROPHOTOMETRIC SYSTEM

William M. Ward, Brea, and Joseph Ashley, Whittier, Calif., assignors to Beckman Instruments, Inc., a corporation of California Filed Feb. 24, 1958, Ser. No. 717,146

14 Claims. (Cl. 88—14)

This invention relates to spectrophotometers and, in particular, to a double monochromator spectrophotometer combining a prism and a grating. The instrument of the invention is particularly useful in the infrared region and will be described herein in conjunction with an infrared spectrophotometer. However, the invention is not limited to any particular wavelength region.

Compared with a single monochromator, a prism-grating double monochromator effects a great reduction in stray light, can be adapted to cancel thhe optical aberration known as coma, can give a more uniform degree of resolution over extended wavelength ranges using a single prism material only, and give a large gain in spectral resolution. Alternatively, where enhanced resolution is not required, all or part of the gain in resolution may be "traded" for gain in spectral scanning speed by operating at wider slit widths or for improved signal-to-noise ratio by reducing amplifier gain.

In the prism-grating monochromator of the invention, the dispersion of the prism is added to that of the grating. Also, the prism serves to eliminate the interference of overlapping orders of diffraction of the grating. Radiation of a single wavelength impinging on a grating is in general diffracted in discrete, different directions, with the different directions identified as first order, second order, etc. If a beam of mixed wavelengths is impinged on a grating, the direction of first-order diffraction of one wavelength in the beam will coincide with the direction of higher order diffraction of other wavelengths. In order to scan a spectral range including such wavelengths by rotating the grating to direct different wavelengths out of a slit, impinging radiation of wavelengths of interfering orders which would otherwise pass through the system must be excluded or sorted out by suitable means. In a prism-grating instrument, the exclusion or order sorting is performed by the prism.

It is an object of the invention to provide a prism-grating monochromator operable over several orders of the grating and having a simple mechanism for coordinating automatically the wavelength selective action of the prism with that of the grating. A further object of the invention is to provide an instrument which scans successive orders consecutively without need of arresting the wavelength drive or of manually adjusting or shifting the grating.

It is another object of the invention to provide a plurality of coaxial cams driven as a unit for scanning the prism and grating through a plurality of orders. A further object is to provide such a mechanism which is cyclical in operation, being ready for another scan at the completion of the previous scan. A further object of the invention is to provide one cam on such an instrument for actuating external controls to change the scanning speed, zero the recording mechanism, and shut off the scan at appropriate points and in synchronism with the prism and grating movements.

It is an object of the invention to provide a prism-grating monochromator utilizing recording means for continuously recording the multi-order spectrum which recording means at the end of the spectral run is automatically in position for the ensuing run. A further object of the invention is to provide a prism-grating instrument in which the grating is oscillated through a plurality of cycles while the prism is oscillated through a single cycle to provide the order sorting function. A further object is to provide such an instrument in which there is a slight regression of the prism during the reverse portion of each cycle of the grating to provide a slight overlap in the recorded output of the multi-order recording. The invention also comprises novel details of construction and novel combinations and arrangements of parts, which will more fully appear in the course of the following description. The drawings merely show and the description merely describes preferred embodiments of the present invention which are given by way of illustration or example.

In the drawings:

Fig. 1 is a schematic representation of a preferred embodiment of the invention;

Fig. 2 illustrates an alternative embodiment of a portion of the instrument of Fig. 1;

Fig. 3 is a graph showing the relative motions of the grating and prism units of the instrument of Fig. 1; and Fig. 4 illustrates a typical multi-order recording produced by the instrument of Fig. 1.

In the instrument of Fig. 1, radiation from a suitable source such as an infrared source, not shown, enters the monochromator via entrance slit 10 and is directed to a collimating mirror 11. The radiation beam is then directed to a first dispersing unit which is preferably a prism 12 of sodium chloride or other suitable material and a Littrow mirror 13. The beam from the collimating mirror 11 traverses the prism 12 and is reflected back through the prism to the collimating mirror by the Littrow mirror 13. The dispersed radiation returning to the collimating mirror is reflected by a flat mirror 14 to a focus at an intermediate slit 15. In the preferred mode of operation of the instrument, the intermediate slit 15 is adjusted to be always appreciably wider than the image of the entrance slit 10 which would form at the intermediate slit in monochromatic light so that a relatively broad band of wavelengths passes the intermediate slit. However, this band of wavelengths should not become so wide as to pass more than one spectral order at any given wavelength setting of the monochromator.

The beam of radiation from the intermediate slit 15 is directed by a flat mirror 16 to a second collimating mirror 17 and thence to a second dispersing unit which is a grating 18 where the beam undergoes a further, relatively large dispersion. The dispersed rays are again directed to the collimating mirror 17 which focuses them in the plane of an exit slit 19, which exit slit is normally operated to have a width equal to that of the entrance slit 10. The narrow band of radiation selected by the exit slit passes on to a radiation detector 20 which produces an electrical signal varying as a function of the radiation impinging on the detector. The output signal from the radiation detector is connected to a pen servo-amplifier 21 for driving a pen motor 22 which actuates a marking pen 23 of a recorder 24.

As an alternative, the optical system of Fig. 1 can be used in reverse, i.e., radiation from the source could enter at slit 19, impinge first on the grating 18, subsequently traverse the prism 12, and emerge at the slit 10. In another alternative way to operate the instrument, the entrance slit 10 can be maintained relatively wide and the intermediate slit 15 and exit slit 19 can be maintained equal and relatively narrow.

In the operation of the instrument for a spectral run, the Littrow mirror 13 and grating 18 are rotated through particular angles to scan the desired wavelength band. A preferred form of mechanism for providing this scan over several orders of the grating automatically is shown in Fig. 1. This instrument provides synchronous operation of the mirror and grating drives and also automatically synchronizes the operation of the other elements of the spectrophotometer with the dispersing unit drives. A multi-lobe grating cam 28 is mounted on a shaft 29 which is driven by a drive motor 30, the direction of rotation of the cam being clockwise as viewed in Fig. 1. The grating cam 28 drives the grating 18 through a linkage comprising a cam follower 31 carried on an auxiliary bar 32, which in turn is pivotally supported on another auxiliary bar 33 which rotates about a point 34, and a driving bar 35 which rotates about a point 36, the grating 18 being fixed to the bar 35 for rotation therewith. Means are provided for urging the cam follower 31 into contact with the cam 28 which may comprise a tension spring but preferably is a commercially available constant-force loading device known as a "Negator" 39, which includes a steel tape 40 coupled to the bar 32 adjacent the cam follower 31.

The cam 28 oscillates the grating 18 through a plurality of angular excursions, in this instance four, for each revolution of the cam, with the grating passing through a common angular range during the forward and reverse portions of each cycle of oscillation. For a given direction of diffraction, a grating will have an optimum incidence angle which is determined by the so-called blaze angle, and the cam 28 is preferably formed so that the angular excursions of the grating will be centered around this optimum angle as this provides the most efficient use of the available energy in each wavelength range. The bars 32, 33, 35 are preferably dimensioned and coupled so that the bars 33 and 35 are maintained parallel, thus making the cam follower 31 describe a circular arc, the line from the cam follower to its center of rotation being parallel to the bars 33, 35.

The linkage comprising bars 32, 33 and 35 provides freedom of choice in locating the cam 28 and grating 18. The desired angular excursion of the grating and a convenient cam size determine the necessary radius of rotation of the cam follower. With the three-bar linkage, the actual distance between the cam follower and the axis of rotation 36 of the grating may be made substantially larger or substantially smaller than the cam follower rotation radius, thereby allowing greater freedom and convenience in designing the layout of the instrument. Thus, in the structure of Fig. 1, the distance between the cam follower 31 and the grating axis 36 is appreciably larger than the radius of rotation of the cam follower. Each of the bars 33, 35 is preferably made adjustable in length, as by being made in three threadedly joined sections with the center section reverse-threaded at opposite ends. Simultaneous shortening or lengthening of the bars 33, 35 permits changing the length of the radius of rotation of the cam follower to adjust the linkage for the particular line spacing of the particular grating being used.

An alternative embodiment of the linkage is shown in Fig. 2. In this embodiment, only a single adjustment is necessary to fit the linkage to a particular grating line spacing. The cam follower 31 is slidably mounted in a slot 41 in a bar 42 which is pivoted at one end at the point 34. Another bar 43 joins the free end of bar 42 with the free end of a bar 44, the latter bar being pivoted at point 36 and carrying the grating 18. The cam follower 31 is clamped in the desired position in the slot 41 by a nut, not shown, and is adjustable to any desired position along the slot.

The refractive dispersing unit of a monochromator may be a single prism which is rotated to vary the wavelength passed thereby, but it is more convenient in infrared instruments to use a fixed prism backed by a rotatable mirror, usually referred to as a Littrow mirror. In the instrument of Fig. 1, a mirror cam 47 is mounted on the shaft 29 for synchronous rotation with the grating cam 28. The rotating element of the prism unit, in this case being mirror 13, is mounted on a bar 48 which is pivoted at point 49 adjacent the mirror, the bar having a cam follower 50 adjacent the other end for engaging the mirror cam 47. A tension spring 51 serves to urge the cam follower into engagement with the mirror cam.

Surfaces 54, 55, 56 and 57 of the grating cam 28 produce the forward working excursions of the grating 18 and surfaces 58, 59, 60, and 61 produce the reverse or reset excursions with the surface 61 returning the grating to the initial position ready for a complete new spectral run. Thus, four oscillation cycles of the grating are provided for one revolution of the cam. The mirror cam 47 produces one oscillation cycle of the mirror in one revolution with the major portion of the cam producing the forward or working excursion and surface 62 providing the reverse or reset portion of the cycle. The forward or working portion of the mirror cam 47 preferably includes surfaces 65, 66, and 67 which provide slight reverse motion of the mirror while the grating is moving through the reverse portions of its cycles corresponding to surfaces 58, 59, and 60 respectively of the grating cam. These slight reverse motions of the mirror are an accommodation to the slight overlapping of wavelength between successive grating orders, as desirably built into and determined by the contours of grating cam 28. Curve 69 of Fig. 3 represents the angular position of the grating during one revolution of the cams and curve 70 represents the corresponding position of the mirror. The solid portion of each curve represents the forward or working excursion and the dashed portion represents the reverse or reset portion of each cycle.

The grating cam 28 drives the grating 18 and the mirror cam 47 drives the mirror 13 in such a way that the complete spectral range of several orders is traversed automatically without stopping or reversing the drive mechanism, or manually resetting the grating. The angular excursions of the grating need not be the same for each order and may be varied to optimize the respective wave-length limits. Further, the angular rate of grating rotation may be varied in any desired ratio from one order to the next without changing the rate of rotation of the cam, the rate of grating rotation depending on the wavelength scale expansions desired on the recorder chart. The forward or working surfaces 54, 55, 56, 57 of the grating cam can be cut for linear abscissa calibration on the chart in wavelength, wavenumber, logarithm of wavelength, or other units, regardless of different scale expansions for the different orders. The slight overlapping of spectral ranges assures that there will be neither blank wavelength areas in the record nor the problem of closely matching the ends of adjoining wavelength ranges.

As indicated previously, the intermediate slit 15 is preferably maintained wider than the entrance and exit slits 10, 19, the maximum permissible width of the intermediate slit being such that in no portion of the total spectral range is more than a single order of radiation transmitted by the slit at any given time. In a particular infrared spectrophotometer constructed as shown in Fig. 1, the intermediate slit was always about 0.5 mm. wider than the entrance and exit slits. The relatively wide intermediate slit permits the deviant rays resulting from coma to pass to the grating side of the instrument where the coma is compensated or cancelled.

The width of each of the slits in variable in the conventional manner and means are provided for controlling the slit widths as a function of wavelength to maintain resolution near an optimum value throughout the recorded wavelength range. A potentiometer 73 is provided with a resistance characteristic corresponding to the desired relationship of slit width to wavelength, with arm 74 of the potentiometer being driven by the shaft 29 in synchronism with the cams 28 and 47. A D.C. source is connected across the potentiometer 73 and the signal from the arm 74 is coupled to a servoamplifier 75 which drives a slit motor 76. A potentiometer 77 coupled across a D.C. source has an arm 78 mechanically driven by the slit motor 76 to provide a position feedback signal for the servoamplifier 75. The slit motor 76, being also mechanically coupled to the three slits, varies their width, thus providing slit width control as a function of cam position or wavelength.

The instrument of Fig. 1 also provides the following which are features of the invention: means for blocking recording of the signal from the radiation detector during the reverse portions of the grating cycles; means for increasing the speed of the drive motor during the reverse grating excursions; and means for automatically stopping the instrument following a complete spectral run with the instrument in position for starting the next run.

A control cam 81 is driven by the drive motor 30, preferably being on the shaft 29 with the grating cam 28 and mirror cam 47. The control cam 81 has high zones corresponding to the forward angular grating excursions and low zones corresponding to the reverse excursions. These zones act respectively to open and close a switch 82 which in turn operates a relay 83. Actuation of the relay during the reverse excursions of the grating deactivates the chart marking pen 23, such as by grounding the input to the pen servoamplifier 21.

A chart 84 and the marking pen 23 of the recorder 24 are relatively displaced along a first recorder coordinate direction by the drive motor 30 in synchronism with the cams on the shaft 29. The pen motor 22 relatively displaces the marking pen 23 and chart 84 along a second coordinate direction as previously described. The relay 83 is also coupled to a motor control 85 with the relay actuating the motor control to increase the speed of the drive motor 30 during reverse grating excursions, thus reducing the total time required for a complete spectral run. A switch 86 is actuated by a tap 87 carried on the control cam 81 to stop the drive motor when the cams are in the position shown in Fig. 1 which is the initial position for a run, the switch 86 being connected into the motor control 85 for controlling the drive motor. A manually operated start switch 88 is also coupled to the motor control 85 for starting the run, such as by shunting momentarily the switch 86.

In the preferred embodiment of the recorder 24, the chart 84 is movable and is cyclically or repetitively calibrated so that on completion of a full revolution of the cams, the chart and marking pen are again in position to record a new run. A circular chart with one rotation for each complete spectral run could be used. However, it is preferred to use a linear chart in the form of a continuous roll and preferably with a pattern, such as that of Fig. 4, repetitively printed thereon.

The chart of Fig. 4 shows the result of a complete spectral run. The abscissa direction is calibrated linearly in wavenumber with the first and second orders recorded at 50 wavenumbers per inch and the third and fourth orders recorded at 200 wavenumbers per inch with the orders reading from right to left. The gaps or blank intervals between successive orders correspond to the reverse or reset portions of the grating rotation cycles during which the pen is held at the zero level. The overlapping of the individual spectral ranges is seen at each side of each of the gaps between the orders. The angle included by the reverse surface 61 of the grating cam 28 and the reverse surface 62 of the mirror cam 47 is several times and preferably at least three times greater than each of the angles included by the reverse surfaces 58, 59 and 60, and 65, 66 and 67 of the grating and mirror cams respectively. This large reverse angle is ordinarily positioned between the end of a run and the start of the next run, providing a large gap on the chart for record-keeping purposes and providing a time interval between continuous runs for making desired adjustments and changes. If the recorder is of stationary chart type with the pen being driven in two coordinate directions, the switch 86 may also actuate a clutch to permit return of the marking pen to the initial wavelength position.

Thus, it is seen that a single drive motor 30 synchronously drives the grating 18 through a plurality of forward and reverse angular excursions while driving the mirror of the refractive dispersing unit through a single cycle of progressive wavelength excursions and also drives a control mechanism for effecting control of the associated elements of the spectrophotometer, such that the grating and the refractive dispersing unit coact on successive forward excursions of the grating to direct different predetermined orders of wavelengths to the radiation detector.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a monochromator, the combination of: means defining a radiation path including in series first slit means, refractive dispersing means including a prism, intermediate slit means, grating means, and second slit means, said intermediate slit means being adapted to limit the range of wavelengths traversing said path between said refractive means and said grating means; first drive means for actuating said refractive means to vary the wavelengths passing along said path between said first and intermediate slit means; second drive means for varying the angular disposition of said grating means with respect to said path, said second drive means including a multi-lobe cam adapted on unidirectional actuation to drive said grating means through a plurality of forward angular excursions alternating with reverse angular excursions; and means for coupling said second drive means to said first drive means for simultaneous operation through different patterns as determined by the respective drive means, with said grating means and said refractive dispersing means coacting on successive forward excursions of said grating means to direct different predetermined orders of wavelengths along said path.

2. In a monochromator, the combination of: means defining a radiation path including in series first slit means, refractive dispersing means including a prism, intermediate slit means, grating means, and second slit means, said intermediate slit means being adapted to limit the range of wavelengths traversing said path between said refractive means and said grating means; first drive means for actuating said refractive means to vary the wavelengths passing along said path between said first and intermediate slit means through progressive wavelength excursions in a plurality of successive intervals; second drive means for varying the angular disposition of said grating means with respect to said path, said second drive means including a multi-lobe cam adapted on unidirectional actuation to drive said grating means through a plurality of forward angular excursions during said successive intervals alternating with reverse angular excursions between said intervals, with each of said forward angular excursions passing through a common angular range; and means for coupling said second drive means to said first drive means for simultaneous operation through different patterns in each successive interval as determined by the respective drive means, said grating means and said refractive dispersing means coacting during said successive intervals to direct different predetermined orders of wavelengths along said path.

3. In a monochromator, the combination of: means defining a radiation path including in series first slit means, refractive dispersing means including a prism, intermediate slit means, grating means, and second slit means, said intermediate slit means being adapted to limit the range of wavelengths traversing said path between said refractive means and said grating means; first drive means for actuating said refractive means to vary the wavelengths passing along said path between said first and intermediate slit means through progressive wavelength excursions in a plurality of successive intervals, said first drive means including means for reversing the direction of actuation between said successive intervals to effect overlapping of the wavelengths passed at the end of one excursion and the start of the next excursion in the next successive interval; second drive means for varying the angular disposition of said grating means with respect to said path, said second drive means including a multi-lobe cam adapted on unidirectional actuation to drive said grating means through a plurality of forward angular excursions during said successive intervals alternating with reverse angular excursions between said intervals, with each of said forward angular excursions passing through a common angular range; and means for coupling said second drive means to said first drive means for simultaneous operation through different patterns in each successive interval as determined by the respective drive means, with said grating means and said refractive dispersing means coacting during said successive intervals to direct different predetermined orders of wavelengths along said path.

4. In combination: means defining a radiation path including in series first slit means, refractive dispersing means including a prism, intermediate slit means, grating means, and second slit means, said intermediate slit means being adapted to limit the range of wavelengths traversing said path between said refractive means and said grating means; first drive means for actuating said refractive means to vary the wavelengths passing along said path between said first and intermediate slit means; second drive means for varying the angular disposition of said grating means with respect to said path, said second drive means including a multi-lobe cam adapted on unilateral actuation to drive said grating means through a plurality of forward angular excursions alternating with reverse angular excursions; recording means including a relatively displaceable chart and writing element; third drive means for relatively displacing said chart and writing element; and a prime mover coupled to said first, second and third drive means for simultaneous operation through different patterns as determined by the respective drive means, with said grating means and said refractive dispersing means coacting on successive forward excursions of said grating means to direct different predetermined orders of wavelength along said path.

5. An instrument as defined in claim 4 in which said chart is cyclically calibrated and said cam is rotatable to provide the desired plurality of excursions in one cycle of rotation, and in which said third drive means drives said chart through one cycle of its calibration while said second drive means is driving said cam through one cycle of rotation.

6. An instrument as defined in claim 5 including: control means for controlling the output of said prime mover; and means carried on one of said drive means for actuating said control means on completion of the rotation cycle of said cam to stop said first, second and third drive means.

7. In a monochromator, the combination of: means defining a radiation path, said means including in series first slit means, refractive dispersing means including a prism, intermediate slit means, grating means, and second slit means, said intermediate slit means being adapted to limit the range of wavelengths traversing said path between said refractive means and said grating means; first and second rotatable cams mounted on a common shaft; means carried by said refractive means for engaging said first cam in driving relationship, said first cam in a single revolution driving said refractive means through a series of forward wavelength excursions alternating with reverse excursions of relatively small range compared with the forward excursions, whereby said refractive means in a single revolution of said cam varies over an extended range of the wavelengths traversing said path between said first and said intermediate slits; and means carried by said grating means for engaging said second cam in driving relationship, said second cam in a single revolution oscillating said grating means through alternating forward and reverse angular excursions synchronized with the forward and reverse excursions of said refractive means, with each of the forward excursions of said grating means passing through a common angular range, whereby said grating means coacts with said refractive means to transmit during successive forward excursions successive orders of radiation within said extended wavelength range along said path joining said first and second slit means.

8. In a monochromator, the combination of: means defining a radiation path, said means including in series first slit means, refractive dispersing means including a prism, intermediate slit means, grating means, and second slit means, said intermediate slit means being adapted to limit the range of wavelengths traversing said path between said refractive means and said grating means; first and second rotatable cams mounted on a common shaft; means carried by said refractive means for engaging said first cam in driving relationship, said first cam in a single revolution driving said refractive means through a series of forward wavelength excursions alternating with reverse excursions of relatively small range compared with the forward excursions, whereby said refractive means in a single revolution of said cam is varied over an extended range of the wavelengths traversing said path between said first and said intermediate slits; and means carried by said grating means for engaging said second cam in driving relationship, said second cam in a single revolution oscillating said grating means through alternating forward and reverse angular excursions synchronized with the forward and reverse excursions of said refractive means, with each of the forward excursions of said grating means passing through a common angular range, and the angular travel of said second cam during all but the last of said reverse excursions being small relative to the angular travel during said forward excursions, the angular travel of said second cam during said last reverse excursion being at least several fold greater than the other of said reverse excursions, whereby said grating means coacts with said refractive means to transmit during successive forward excursions successive orders of radiation within said extended wavelength range along said path joining said first and second slit means.

9. In combination: means defining a radiation path including in series first slit means, refractive dispersing means including a prism, intermediate slit means, grating means, and second slit means, said intermediate slit means being adapted to limit the range of wavelengths traversing said path between said refractive means and said grating means; first drive means for actuating said refractive means to vary the wavelengths passing along said path between said first and intermediate slit means; second drive means for varying the angular disposition of said grating means with respect to said path, said second drive means including a multi-lobe cam adapted on unilateral actuation to drive said grating means through a plurality of forward angular excursions alternating with reverse angular excursions; recording means including a relatively displaceable chart and writing element; third drive means for relatively displacing said chart and writing element along a first coordinate path;

a prime mover coupled to said first, second and third drive means for simultaneous operation through different patterns as determined by the respective drive means, said grating means and said refractive dispersing means coacting on successive forward excursions of said grating means to direct different predetermined orders of wavelengths along said path; radiation detection means responsive to radiation traversing said path for relatively displacing said writing element and chart along a second coordinate direction as a function of the radiant energy directed via said path to said detection means; switch means coupled to said detection means for inactivating the response of said writing element; and control means actuated by said prime mover in synchronism with said drive means for actuating said switch means during reverse excursions of said grating means to deactivate said writing element.

10. An instrument as defined in claim 9 in which said prime mover has a low speed and a high speed output and in which said switch means shifts said prime mover from said low speed output during said forward excursions to said high speed output during said reverse excursions in synchronism with the activating and inactivating of said writing element.

11. In a monochromator having a radiation path including a prism dispersing unit and a grating dispersing unit in series, with each of the units having a pivoting element, the combination of: a first cam for pivoting the grating pivoting element, said first cam oscillating the grating element through a plurality of cycles in a single revolution with the grating element passing through a particular common angular range in each cycle; and a second cam for pivoting the prism pivoting element, said second cam oscillating the prism element through a single cycle in a single revolution, said first and second cams being mounted on a common drive shaft with the initiation of said single cycle of said second cam corresponding to the initiation of one of said cycles of said first cam whereby, in a single revolution, said prism dispersing unit traverses a spectral range and said grating dispersing unit traverses a different order of the grating within said range in each of said plurality of cycles.

12. In a monochromator having a radiation path including a prism dispersing unit and a grating dispersing unit in series, with each of the units having a pivoting element, the combination of: a first cam for pivoting the grating pivoting element, said first cam oscillating the grating element through a plurality of cycles in a single revolution, with the grating element passing through a particular common angular range in both the forward and reverse portions of each cycle; and a second cam for pivoting the prism pivoting element, said second cam oscillating the prism element through a single cycle in a single revolution while producing reverse motion of the prism element during the reverse portion of each of said plurality of cycles of the grating element, said first and second cams being mounted on a common drive shaft with the initiation of said single cycle of said second cam corresponding to the initiation of one of said cycles of said first cam whereby, in a single revolution, said prism dispersing unit traverses a spectral range and said grating dispersing unit traverses a different order of the grating within said range in each of said plurality of cycles.

13. In a monochromator having a radiation path including a prism dispersing unit and a grating dispersing unit in series, with each of the units having a pivoting element, the combination of: a first cam for pivoting the grating pivoting element, said first cam oscillating the grating element through a plurality of cycles in a single revolution with the grating element passing through a particular common angular range in both the forward and reverse portions of each cycle; a second cam for pivoting the prism pivoting element, said second cam oscillating the prism element through a single cycle in a single revolution; and a third cam for actuating an instrument control, said third cam moving the control from a first position during the forward portion of each of said plurality of cycles of the grating element to a second position during the reverse portion thereof, said first, second and third cams being mounted on a common drive shaft with the initiation of said single cycle of said second cam corresponding to the initiation of one of said cycles of said first cam whereby, in a single revolution, said prism dispersing unit traverses a spectral range and said grating dispersing unit traverses a different order of the grating within said range in each of said plurality of cycles.

14. In a monochromator, the combination of: means defining a radiation path including in series first slit means, refractive dispersing means including a prism, intermediate slit means, grating means, and second slit means, said intermediate slit means being adapted to limit the range of wavelengths traversing said path between said refractive means and said grating means; first drive means for actuating said refractive means to vary the wavelengths passing along said path between said first and intermediate slit means; a driving bar fixed to said grating means and rotatable about a first axis for varying the wavelengths transmitted by said grating means through the monochromator; a first auxiliary bar rotatable about a second axis parallel to and displaced from said first axis; a second auxiliary bar pivotally coupled to said driving bar and said first auxiliary bar for maintaining said driving and first auxiliary bars in predetermined spaced relationship; a cam follower mounted on one of said auxiliary bars; a multilobe cam adapted on unidirectional actuation to engage said cam follower and drive said grating means through a plurality of forward angular excursions alternating with reverse angular excursions; and means for coupling said cam to said first drive means for simultaneous operation through different patterns, with said grating means and said refractive dispersing means coacting on successive forward excursions of said grating means to direct different predetermined orders of wavelengths along said path.

References Cited in the file of this patent

UNITED STATES PATENTS

| | | |
|---|---|---|
| 2,587,451 | Farrand | Feb. 26, 1952 |
| 2,670,652 | Sherman | Mar. 2, 1954 |
| 2,856,531 | Brouwer | Oct. 14, 1958 |

FOREIGN PATENTS

| | | |
|---|---|---|
| 779,199 | Great Britain | July 17, 1957 |

OTHER REFERENCES

"A Versatile Infra-red Spectrograph," Oetjen, Journal of the Optical Society of America, vol. 35, No. 12, December 1945, pages 743–754.